UNITED STATES PATENT OFFICE.

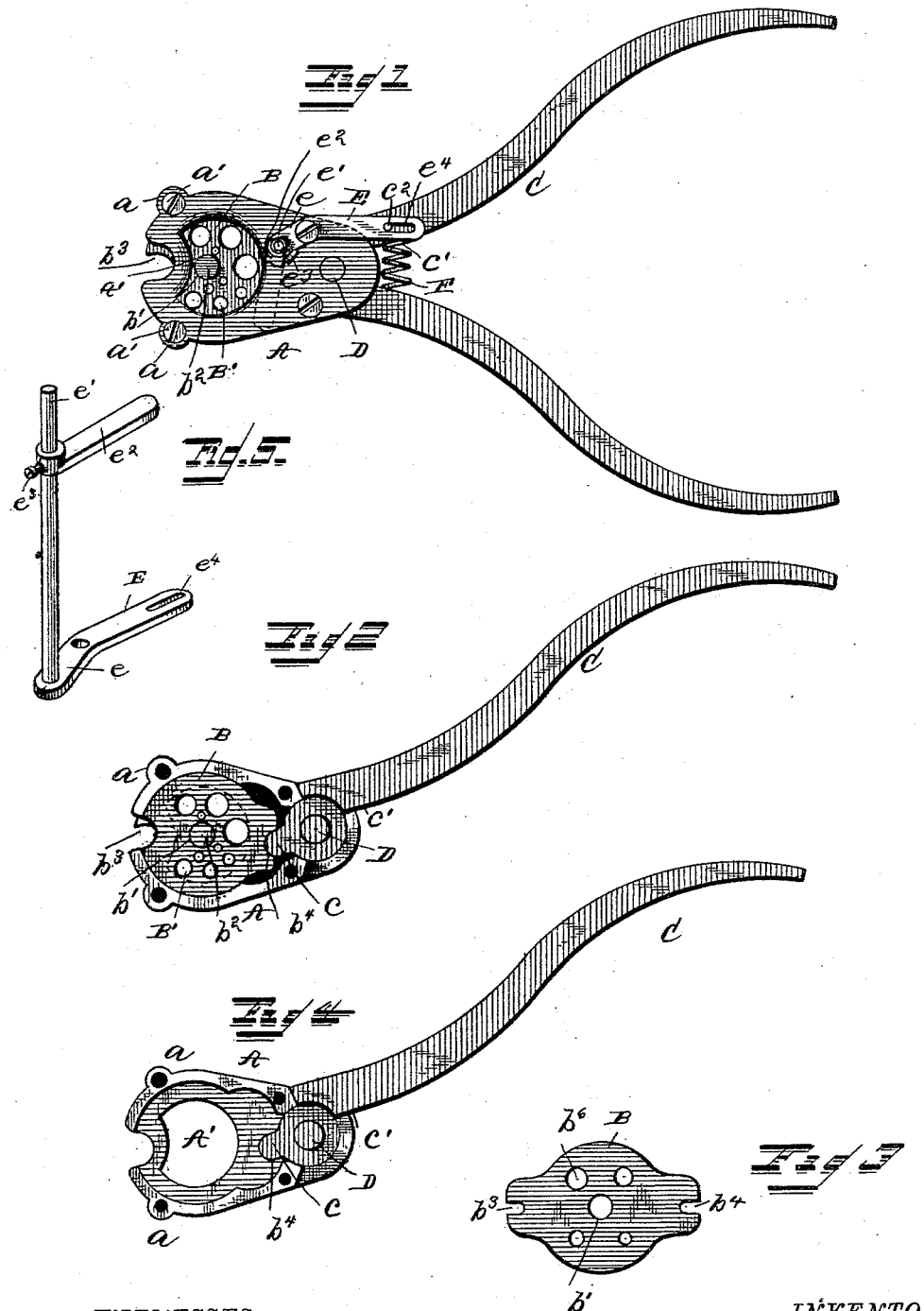

SILAS E. SELLECK, OF COLD SPRING, NEW YORK.

NIPPERS.

SPECIFICATION forming part of Letters Patent No. 401,308, dated April 9, 1889.

Application filed August 18, 1888. Serial No. 283,092. (No model.)

*To all whom it may concern:*

Be it known that I, SILAS E. SELLECK, a citizen of the United States, and a resident of Cold Spring, in the county of Putnam and State of New York, have invented certain new and useful Improvements in Cutting-Pliers; and I do hereby declare that the following is a full, clear, and exact description of the invention, which will enable others skilled in the art to which it appertains to make and use the same.

This invention relates to cutting-pliers.

The object is to produce cutting-pliers which shall be of such construction that it may be used to cut wire of different sizes and in any desired length, or which may be adjusted to cut the same in pieces of exactly the same length when desired; furthermore, to produce cutting-pliers which shall be simple of construction, efficient and durable in use, and comparatively inexpensive of production.

To these ends the invention consists of the combination of parts, including their construction, substantially as hereinafter set forth and claimed.

In the accompanying drawings, forming part of this specification, and in which like letters of reference indicate corresponding parts, Figure 1 is a side elevation showing the device intact with the gage attached to its side. Fig. 2 is an elevation with one side of the head or casing removed, showing the disk therein. Fig. 3 is a detail view of another form of cutting-disk, which may be employed instead of the one shown in Fig. 2. Fig. 4 is a detail view of one side of the head or casing with the disk removed, showing the internal construction of the same; and Fig. 5 is a detail view of the gage.

Referring to the drawings, A designates the head or casing, which is cut away, as shown in Fig. 4, so as to allow the disk B to fit therein. At the upper end of this casing are formed two ears, $a$, through which screws $a'$ extend to hold the cap together, and two other screws at the lower end perform the same function. The side of this head or casing is cut away to form the opening A', so as to allow all of the openings in the disk to be seen, as shown in the drawings, and to be readily accessible when it is desired to use the device.

The disks B, which fit in the head or casing, are made of the finest steel and are tempered to a point as hard as is possible to make steel without the danger of its breaking. A number of openings, B', are formed in each of the two disks and are placed diametrically opposite each other, so as to prevent the wire catching on the sides of the openings when it is desired to cut it.

In the center of the disk is formed an opening, $b'$, in which fits a plug, $b^2$, which is designed to hold the two disks in contact. At the upper end the disk is cut away, as shown at $b^3$, which enables a person to cut off wire, which would be impossible with the other openings—as, for instance, when it would be desired to cut off a piece of wire or nail extending through a piece of wood—and also admits of the device being used as a plier. At the lower end of these disks is formed a groove, $b^4$, in which fits projections $c$ on the handles C. These handles are cut away, as shown at $c'$, so as to allow the two to come together flush with each other, and are held together by means of a pin, D, which passes through the said handles and through the opening in the head or casing.

E designates the gage, which is constructed in the following manner.

$e$ designates a bent arm, which is pivoted to the casing, to the outer end of which is secured an upright, $e'$, on which fits another arm, $e^2$, which is provided with a jam-nut, $e^3$, by means of which it may be secured in any position on the upright. At the opposite end of the arm $e$ to that on which the upright is secured is formed a longitudinal slot, $e^4$, which is designed to fit on a projection, $c^2$, on the handle.

F designates the spring, which is set in openings formed in the handles, to cause them to open when they have been closed.

If desired, the disk may be made, as shown in Fig. 3, with the jaws extending beyond the edge of the disk; but the other form of device is preferred.

The mode of operation is as follows: When it is desired to cut the wires of a certain length, the arm $e^2$ is brought over the opening in the disk which is the size of the wire to be cut. The wire is then inserted through the openings and brought up against the said arm, and when the handles are closed the disks will be caused to revolve in opposite directions, and thus cut the wire perfectly square, and as the handles close the projection $c^2$ on the handle will cause the gage to be thrown to one side, and thus allow the wire to drop out of the opening. The advantage of this device is that it cuts the wire perfectly straight and without leaving a rough edge afterward to be filed or otherwise dressed off.

Having thus fully described my invention, what I claim as new, and desire to secure by Letters Patent, is—

The pliers consisting of the casing or head, the apertured disks having, in addition to their registering wire-receiving apertures, a concaved notch or recess at each of their upper and lower ends, the pivoted handles having at their ends projections which engage with the lower end notches or recesses of the disks, and the gage having a bent arm pivoted to said casing or head, to the outer end of which arm is secured an upright on which fits a second arm registering with any one of the wire-receiving apertures of the disks and which aforesaid or bent arm is provided with an elongated slot receiving a projection on one of the handles, substantially as specified.

In testimony that I claim the foregoing as my own I have hereunto affixed my signature in presence of two witnesses.

SILAS E. SELLECK.

Witnesses:
LEWIS STANBROUGH,
GEORGE W. PURDY, Jr.